United States Patent [19]
Tanaka et al.

[11] Patent Number: 6,028,940
[45] Date of Patent: Feb. 22, 2000

[54] VIRTUAL SHOP COMPUTER NETWORK SYSTEM WHICH DISPLAYS MEMBER SHOPS AND MEMBER SHOP CERTIFICATION METHOD

[75] Inventors: Youko Tanaka, Tokyo; Seizo Motai, Chiba; Katsuhisa Hirokawa, Yokosuka, all of Japan

[73] Assignee: Kabushiki Kaisha Toshiba, Kawasaki, Japan

[21] Appl. No.: 08/828,772

[22] Filed: Mar. 27, 1997

[30] Foreign Application Priority Data

Mar. 29, 1996 [JP] Japan .................. 8-076248

[51] Int. Cl.$^7$ .................................................. H04L 9/00
[52] U.S. Cl. ................................................... 380/54
[58] Field of Search ............................ 380/25, 30, 49, 380/54, 24

[56] References Cited

U.S. PATENT DOCUMENTS

| | | | |
|---|---|---|---|
| 4,405,829 | 9/1983 | Rivest et al. | 380/30 |
| 4,995,082 | 2/1991 | Schnorr | 380/30 |
| 5,485,510 | 1/1996 | Colbert | |
| 5,793,870 | 8/1998 | Conley | 380/54 |

OTHER PUBLICATIONS

Bagshaw E., "Net Profits (Internet and Virtual Shopping)", PC PRO, Apr. 1995, U.K., No. 6, ISSN 1355–4603, pp. 176–182.

Marion L., "Who's Guarding the Till at the Cybermall?", DATAMATION, 15, Feb. 15, 1995, USA, vol. 41, No. 3, ISSN 0011–6963, pp. 38–41.

Sirbu M. et al., "Netbill: An Internet Commerce System Optimized for Network Delivered Services", Digest of Papers of the Computer society Computer Conference (Spring) Compcon, Technologies for the Information Superhighway San Francisco, Mar. 5–9, 1995, No. CONF. 40, Institute of Electrical and Electronics Engineers, pp. 20–25.

*Primary Examiner*—Salvatore Cangialosi
*Attorney, Agent, or Firm*—Pillsbury Madison & Sutro LLP

[57] ABSTRACT

A computer network system includes a first computer of a first corporation having a plurality of member shops and a second computer of a second corporation which is the member shop of the first corporation and runs a virtual shop on a network. The first computer includes a memory for storing display information indicating that a corresponding shop is the member shop of the first corporation, a memory for storing encryption information for encrypting the display information, and an output section for encrypting the display information by the encryption information and outputting the encrypted display information. The second computer includes a reception section for receiving the encrypted display information through the communication line, and a memory for storing the received encrypted display information.

15 Claims, 3 Drawing Sheets

VIRTUAL SHOP COMPUTER NETWORK SYSTEM WHICH DISPLAYS MEMBER SHOPS AND MEMBER SHOP CERTIFICATION METHOD

BACKGROUND OF THE INVENTION

The present invention relates to a virtual shop system on a commercial network constituted by cardholders' computers, virtual shop computers, and a card issuing finance company computer, and a virtual shop certification method.

Conventionally, the computers of cardholders as customers, the computers of virtual shops as member shops, and the computer of a card issuing finance company (acquirer/issuer) are arranged on a commercial network (for example the internet). Customers can make business transactions with virtual shops on the commercial network.

In this case, the card issuing finance company is a company which issues cards such as VISA or JCB cards to general customers, and makes a member shop contract with department stores, hotels, and the like to make business transactions. In addition, the virtual shops include department stores such as MITSUKOSHI. However, the virtual shops are not limited to these and may take various forms.

In this case, each virtual shop on the commercial network does not have means for certifying that the shop is a member shop of a specific card issuing finance company.

For example, a given shop is certified as a member shop which allows the use of a specific credit card by using a method of encrypting code information by the RSA encryption method, and allowing the user to check the authenticity of the shop by decrypting the information on the reception side.

When a credit card is used to make a business transaction on a conventional commercial network, the transaction amount in the corresponding virtual shop is given to a settlement institution.

Since there is no means for certifying that a given virtual shop is a member shop which allows the use of a specific credit card, a customer must believe the displayed contents of the virtual shop and make a business transaction. In addition, a card issuing finance company as a settlement institution cannot check business transactions made by false member shops. For this reason, the handling fees for such transactions cannot be collected. Someone can therefore open a virtual shop on a commercial network disguised as a specific member shop and steal private and important information such as a credit card number or make business transactions by illegally using the network of the card issuing finance company.

According to the method of encrypting code information, a computer checks the information, and the receiver of the information (a customer in a virtual shop) is notified of only the check result. That is, shopping is performed differently from the conventional manner of shopping, in which a customer sees a sticker indicating a card logo, which is attached at the entrance of an actual shop, to confirm that the shop is a member shop, and does his/her shopping. For this reason, some customers hesitate to do shopping in virtual shops.

Furthermore, when a customer performs a business transaction with a virtual shop on a conventional commercial network, he/she cannot check the transaction amount notified to the card issuing finance company by the virtual shop. For this reason, the virtual shop may illegally claim payment for the customer.

BRIEF SUMMARY OF THE INVENTION

The present invention has been made in consideration of the above situation, and has as its object to provide a virtual shop system and a virtual shop certification method which can easily certify that a virtual shop is a member shop of a card issuing finance company that issues a specific credit card, and can guarantee fair transaction amounts.

According to the present invention, there is provided a computer network system comprising: a first computer of a first predetermined corporation having a plurality of member shops, the first computer including means for storing display information indicating that a corresponding shop is the member shop of the first predetermined corporation, means for storing encryption information for encrypting the display information, means for encrypting the display information by the encryption information and outputting the encrypted display information, and means for outputting the output encrypted display information to an external apparatus through a communication line; and a second computer of a second predetermined corporation which is the member shop of the first predetermined corporation and runs a virtual shop on a network, the second computer including means for receiving the encrypted display information through the communication line, and means for storing the received encrypted display information.

With the above structure, the present invention has the following unique effects.

Assume that a virtual shop (e.g., MITSUKOSHI) of a card company (e.g., VISA), which is open on a network, simply displays an image indicating "VISA" or the like on the screen of the virtual shop to certify its authenticity. In this case, this image data can be easily copied and abused by another virtual shop which is not a member shop of the card company. According to the present invention, however, this display information is encrypted within the computer of the card company (e.g., VISA) by using a so-called secret key which is not disclosed, and the encrypted display information is sent to the virtual shop (e.g., MITSUKOSHI). A customer in this virtual shop decrypts the encrypted display information by using decryption information based on a disclosed public key, and displaying the decrypted information on the display of the customer's terminal, thus knowing that MITSUKOSHI is a member shop of VISA. Since this display information can be encrypted only by the disclosed public key provided from the person performed encryption. So, the customer can confirm forgery and rewriting of the display information. Therefore, the information cannot be abused by a dishonest businessman.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described in detail below with reference to the accompanying drawing.

Figure 1:
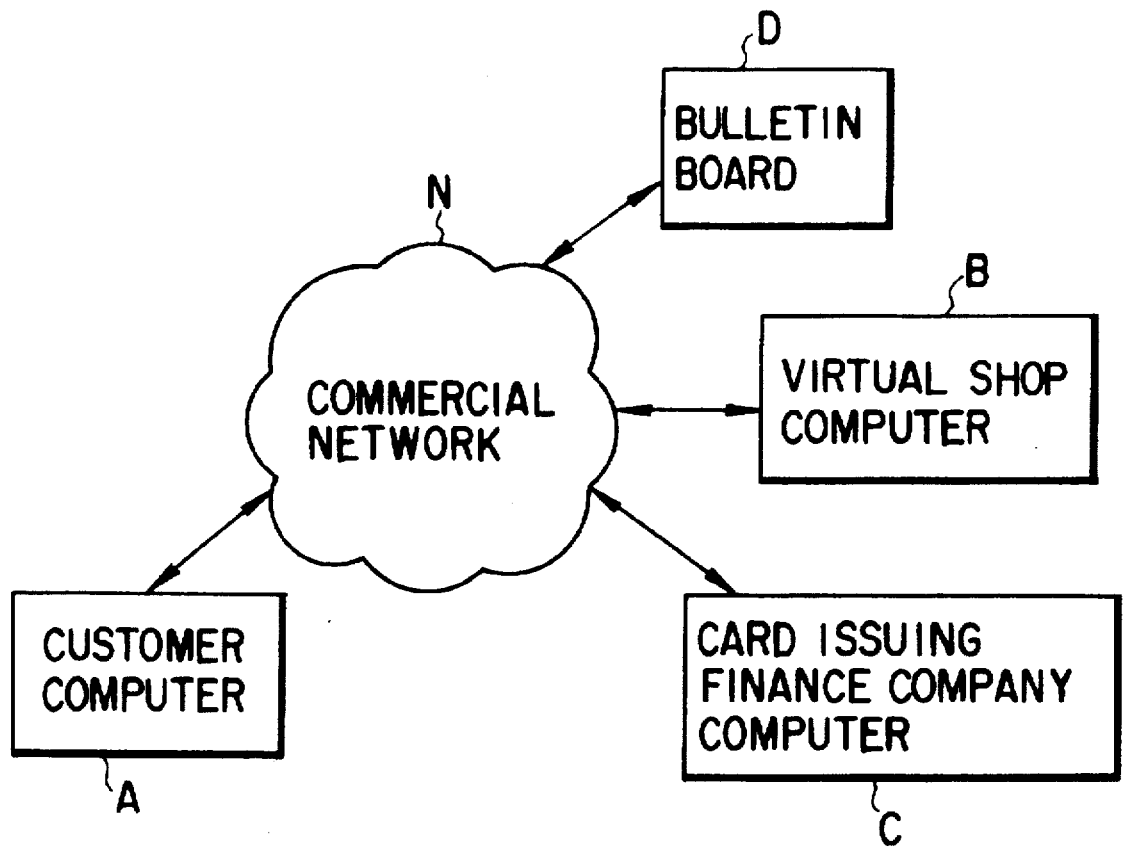
FIG. 1 is a block diagram for explaining the arrangement of a commercial network in the present invention.

FIG. 1 is a block diagram for explaining the arrangement of a commercial network in the present invention.

A commercial network N includes a plurality of bulletin boards D and virtual shop computers B.

A computer A of a customer as a cardholder is connected to the bulletin boards D and the computers B of the virtual shops (member shops such as MITSUKOSHI) in the commercial network N through the commercial network N. The computer A is also connected to a host computer C of a card issuing finance company (e.g., VISA) as a settlement institution, i.e., a member shop contract/card issuing bank (acquirer/issuer) through the commercial network N.

The host computer C of the card issuing finance company is connected to the bulletin boards D and the virtual shop computers B in the commercial network N through the commercial network N.

Figure 2:
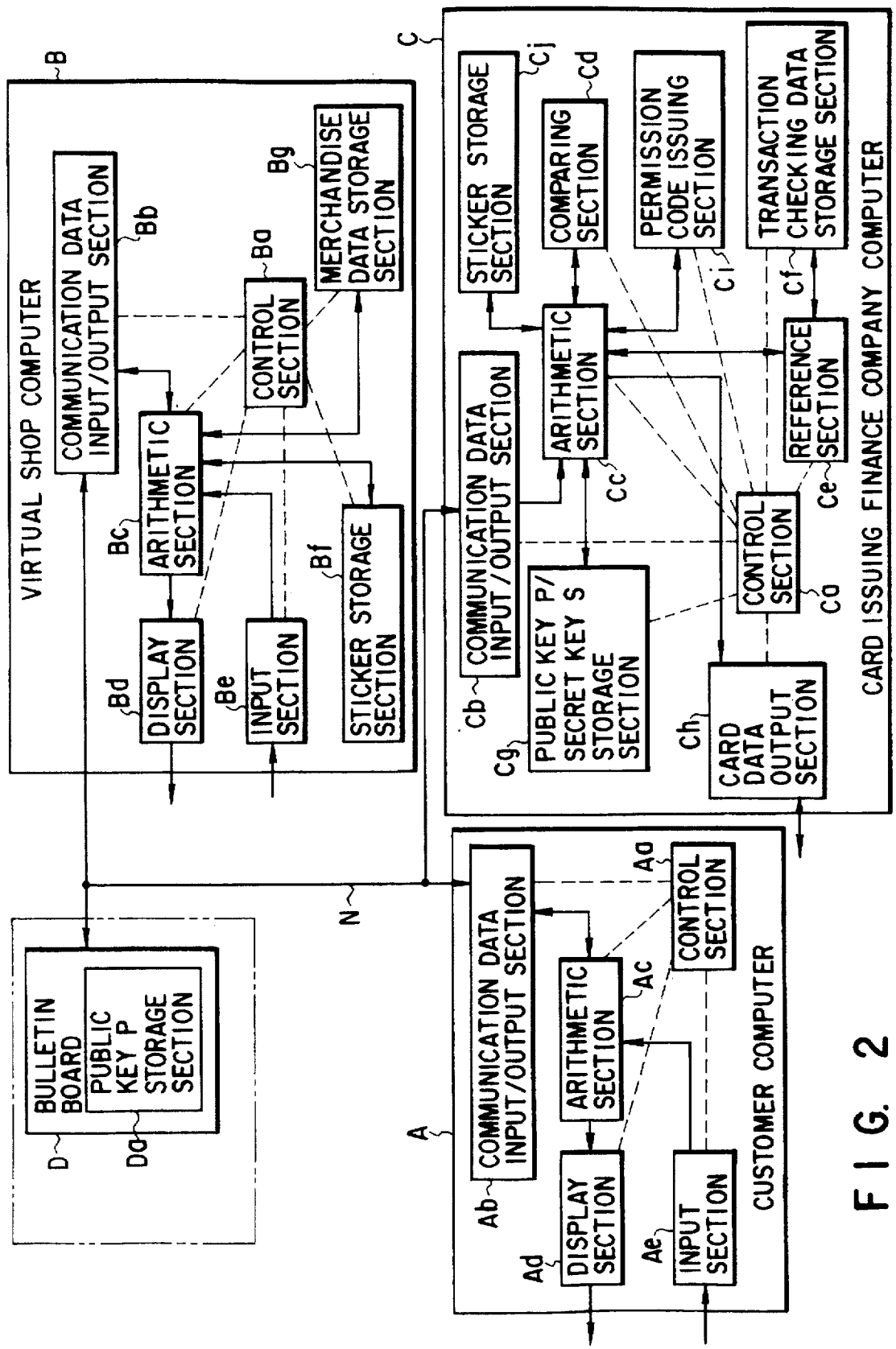
FIG. 2 is a block diagram for explaining the arrangements of computers in the present invention.

FIG. 2 is a block diagram for explaining the arrangement of each computer in the present invention.

The computer A of the customer (cardholder) is constituted by a control section Aa, a communication data input/output section Ab, an arithmetic section Ac, a display section Ad, and an input section Ae. The communication data input/output section Ab acquires data sent from another computer through the commercial network N, and also exchanges data to transmit data to another computer. The calculation section Ac distributes data to proper sections. The calculation section Ac also decrypts encrypted data, and encrypts data. The display section Ad presents information to the customer. The input section Ae receives data required for settlement, e.g., the credit card number and the transaction amount input by the customer. The control section Aa controls the communication data input/output section Ab, the arithmetic section Ac, the display section Ad, and the input section Ae.

The virtual shop computer B is constituted by a control section Ba, a communication data input/output section Bb, an arithmetic section Bc, a display section Bd, an input section Be, a sticker storage section Bf, and a merchandise data storage section Bg. The communication data input/output section Bb acquires data sent from another computer through the commercial network N, and exchanges data to transmit data to another computer. The calculation section Bc distributes data to proper sections, and also encrypts transmission data, as needed. The display section Bd presents information to a clerk in the virtual shop, as needed. The input section Be receives data input by the clerk in the virtual shop, as needed. The sticker storage section Bf stores image data, e.g., sticker data (encrypted with a secret key) indicating a card logo, which is distributed from the card issuing finance company and indicates that the virtual shop is a member shop. The sticker data is presented from the sticker storage section Bf to the customer, as needed. The merchandise data storage section Bg stores data about the merchandise offered by the virtual shop. Merchandise data stored in the merchandise data storage section Bg, e.g., a transaction amount, is encrypted with a public key, together with the identification number of the virtual shop, and the encrypted data is transmitted to the card issuing finance company. The control section Ba controls the display section Bd, the arithmetic section Bc, the display section Bd, the input section Be, the sticker storage section Bf, and the merchandise data storage section Bg.

The host computer C of the card issuing finance company is constituted by a control section Ca, a computer B, a calculation section Cc, a reference section Ce, a transaction checking data storage section Cf, a public/secret key storage section Cg, a card data output section Ch, a permission code issuing section Ci, and a sticker storage section Cj. The communication data input/output section Cb acquires data sent from another computer through the commercial network N, or exchanges data to transmit data to another computer. The arithmetic section Cc distributes data to proper sections. The calculation section Cc also encrypts image data, e.g., sticker data indicating a card logo, which indicates that the virtual shop is a member shop, with a secret key, and decrypts data encrypted with a public key by using a secret key. The comparing section Cd compares the amount input by the customer as a cardholder and sent as transaction data with the amount input by the virtual shop to check whether they differ from each other. The reference section Ce refers to transaction checking data to determine whether to allow the transaction. The transaction checking data storage section Cf stores data about the credit standing and transaction history of the customer, which are required to determine whether the notified transaction is allowed to proceed. The public/secret key storage section Cg stores public/secret key data. The card data output section Ch outputs public key data and the like to a card to be issued to a customer. The authorization code issuing section Ci issues a code which notifies the virtual shop computer B of authorization to proceed with the transaction.

The bulletin board D is a data area set in part of a computer. The computer body is not specifically limited. The bulletin board D includes a public key storage section Da in which public key data corresponding to the secret key data stored in the host computer of the card issuing finance company is stored. The customer computer A or the virtual shop computer B acquires the public key data from the public key storage section Da, as needed.

Figure 3:
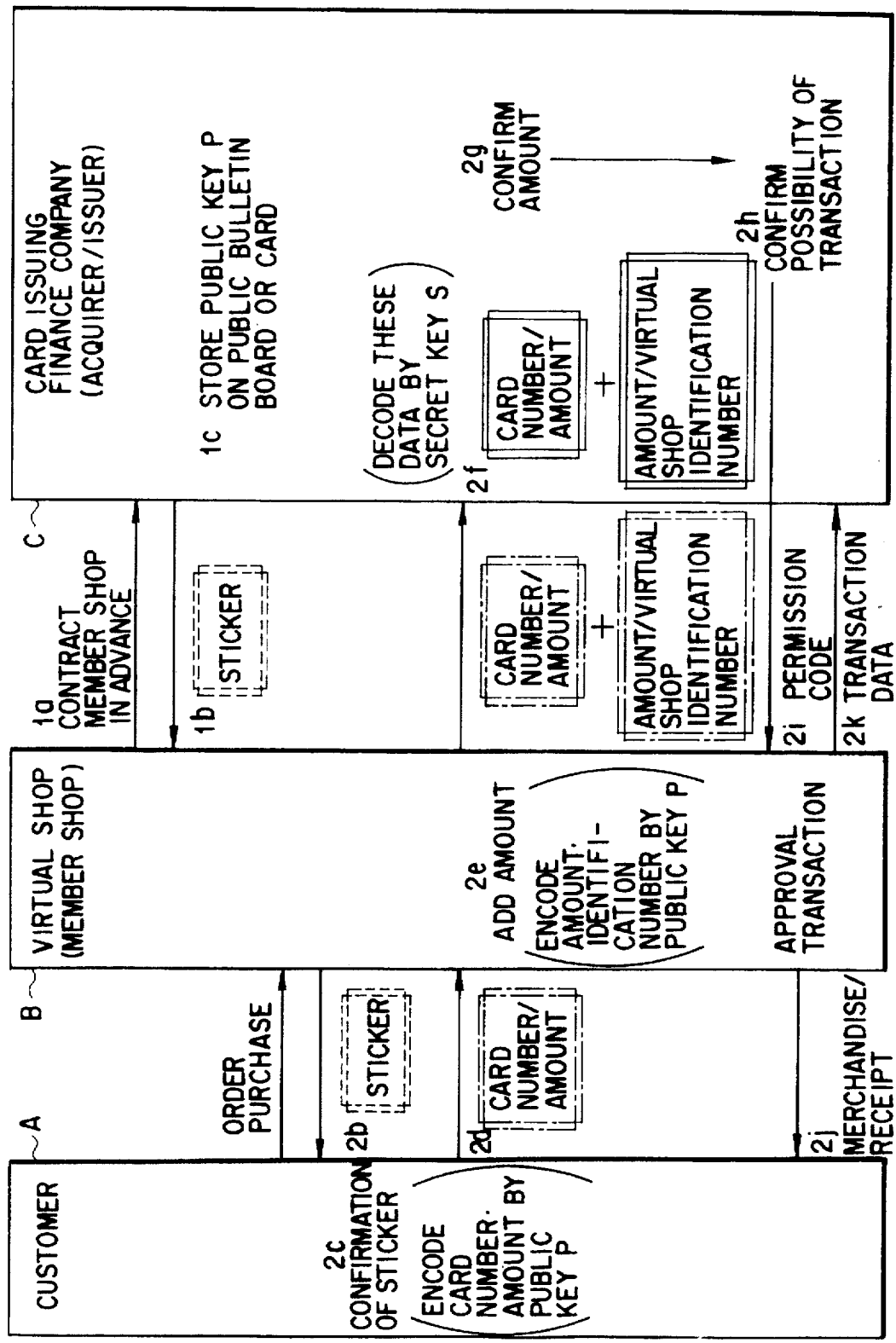
FIG. 3 is a chart showing an example of the flow of processing in the present invention.

FIG. 3 a timing chart showing an example of the flow of processing in the present invention. This processing is divided into step 1 as pre-processing and step 2 as transaction processing.

In step 1a, the virtual shop makes a member shop contract with the card issuing finance company. The method of making the contract is not specifically limited. That is, the contract can be made electronically through the network or on a.document. In step 1b, the card issuing finance company transmits image data indicating the virtual shop is a member shop, e.g., sticker information indicating a card logo, which is encrypted by the calculation section Cc by using the secret key data stored in the public/secret key storage section Cg in the host computer C and read out from the sticker storage section Cj, to the display section Bd of the virtual shop computer B through the communication data input/output section Cb. The encrypted sticker information is stored in the sticker storage section Bf of the virtual shop computer B. In step 1c, the host computer C of the card issuing finance company stores the public key data, stored in the public/secret key storage section Cg, in an area which allows a customer to refer to. For example, the computer C stores the public key data in the public key storage section Da of the bulletin board D or causes the card data output section Ch to output the public key data to a card to be issued to the customer.

In step 2a, the customer uses the computer A to order a specific item or a specific service to the virtual shop computer B. Upon reception of the order, the virtual shop computer B transmits the encrypted sticker information, stored in the sticker storage section Bf, to the customer computer A in step 2b. In step 2c, the customer computer A acquires the public key data stored in the public key storage section Da of the bulletin board D or stored in the customer card, and causes the calculation section Ac to decrypt the encrypted sticker data by using the public key data. The computer A then causes the display section Ad to present the decrypted data to the customer. In this case, the sticker information is displayed. However, the information may be presented by speech using a speech output unit such as a loudspeaker. Upon checking the presented data, the customer inputs his/her credit card number and the transaction amount to the computer A through the input section Ae in step 2d. The input data is encrypted by the calculation section Ac using the public key data stored in the bulletin board D or the card, and transmitted to the virtual shop computer B. Upon reception of the data transmitted from the customer computer A, the virtual shop computer B causes the calculation section Bc to encrypt the amount of the requested item, stored in the merchandise data storage section Bg, and the identification number of the virtual shop by using the public key data stored in the bulletin board D or the virtual shop card, adds the encrypted data to the data of the credit card number and the transaction amount, sent from the customer, and transmits the resultant data to the host computer C of the card issuing finance company in step 2e. Upon reception of the data (the identification number and transaction amount which are input from the virtual shop, and the card number and transaction amount which are input from the customer) from the virtual shop computer B, the host computer C of the card issuing finance company causes the arithmetic section Cc to decrypt the received data by using the secret key data stored in the public/secret key storage section Cg in step 2f. In step 2g, the comparing section Cd receives the decrypted data (the identification number and transaction amount which are input from the virtual shop, and the card number and transaction amount which are input from the customer) to compare the amount input by the customer with the amount input by the virtual shop. If there is no difference between the amounts, the flow advances to step 2h to proceed with the transaction processing. In step 2h, the reference section Ce refers to the transaction checking data storage section Cf to determine whether the transaction can be performed. If YES in step 2h, the flow advances to step 2i to proceed with the processing. In step 2i, a permission code issued by the permission code issuing section Ci is transmitted to the virtual shop computer B. Upon reception of the permission code, the virtual shop computer B follow a selling procedure for the customer, and transmits data as a receipt to the customer computer A. Upon completion of the transaction, the resultant data is transmitted from the virtual shop computer B to the host computer C of the card issuing finance company.

As described above, in a transaction with a virtual shop on the commercial network, the card issuing finance company encrypts image information, speech information, or the like which allows a person to easily make a decision, e.g., sticker information indicating the logo of the card issuing finance company, by using secret key data, and allows the encrypted information to be decrypted by using only public key data. The customer holding the card can therefore check the authenticity of the member shop by his/her eyes or ears, and can reliably perform a transaction.

Consider a transaction using a credit card. In this case, when a customer performs a transaction with a virtual shop on a commercial network on which the computer of the customer as a cardholder, the computer of the virtual shop as a member shop, and the host computer of the card issuing finance company are present, the cardholder can make a settlement with the host computer of the card issuing finance company while hiding information which the member shop need not know. Therefore, leakage of important information such as the credit card number can be prevented. The host computer of the card issuing finance company can prevent the appearance of a virtual shop which disguises as a member shop to perform transactions. In addition, the host computer can prevent even an authentic member shop from making an illegal act, e.g., inflating a transaction amount by making an illegal claim.

As has been described above, according to the present invention, there is provided a virtual shop system and a virtual shop certification method which allows a virtual shop to easily certify that the shop is a member shop allowing the use of a specific credit card, and can ensure fair transaction amounts.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A computer network system comprising:

a first computer of a first corporation associated with a plurality of virtual shops, the first computer including means for storing display information that indicates membership by the plurality of virtual shops; means for storing first encryption information, including a secret key of the first corporation, the secret key being used to encrypt the display information; means for encrypting the display information using the first encryption information; and means for outputting the encrypted display information;

a second computer of a second corporation that is associated with one of the plurality of virtual shops, the second computer including means for receiving the encrypted display information through the network, and a third computer connected to the second computer through the network, the third computer including means for receiving the encrypted display information from the second computer; means for decrypting the encrypted display information using a public key corresponding to the secret key; and means for displaying the decrypted information to a user.

2. A system according to claim 1, wherein the first computer further includes means for storing the display information as a sticker-like image that indicates that a virtual shop having the display information is a virtual shop associated with the first computer.

3. A system according to claim 1, wherein the first computer further includes means for storing the display information as speech information that indicates that a virtual shop having the display information is a virtual shop associated with the first computer.

4. A system according to claim 1, wherein the first computer further includes means for storing the display information as speech information indicating that a virtual shop having the display information is a virtual shop associated with the first computer; and means for sounding the decrypted speech information.

5. A system according to claim 1, wherein the third computer includes means for encrypting a purchase amount and a card number from a card issued by the first corporation using the public key and outputting the encrypted card number and the encrypted amount.

6. A system according to claim 5, wherein the second computer includes means for receiving the encrypted card number and the encrypted amount from the first computer through the network; and means for reading out an identification number of the virtual shop and a merchandise amount input by the virtual shop from a merchandise data storage area, encrypting the identification number and the merchandise amount using the public key, and outputting the encrypted identification number and the encrypted merchandise amount.

7. A system according to claim 6, wherein the first computer includes means for decrypting the encrypted card number, the encrypted amount, the encrypted identification number, and the encrypted merchandise amount from the second computer using the private key; and means for comparing the decrypted amount and the decrypted merchandise amount; and means for determining whether a transaction can be performed based on a result of the means for comparing, and transmitting a determination result to the second computer.

8. A system according to claim 6, wherein the first computer further includes:

means for decrypting the encrypted card number, the encrypted amount, the encrypted identification number, and the encrypted merchandise amount from the second computer using the private key; and means for determining, on the basis of a comparison result obtained by comparing the decrypted amount and decrypted merchant amount, whether a transaction can be performed, and transmitting the determination result to the second computer.

9. A data processing method of a computer network system comprising:

causing a first computer of a corporation that is associated with a plurality of virtual shops to store display information that indicates membership in the plurality of virtual shops;

causing the first computer to store first encryption information, including a secret key of the first corporation, the secret key being used to encrypt information;

causing the first computer to encrypt the display information using the first encryption information and outputting the encrypted display information;

causing a second computer of a second corporation that is associated with one of the virtual shops of the first corporation to receive the encrypted display information through a network and store the encrypted display information;

causing a third computer connected to the second computer through the network to receive the encrypted display information from the second computer;

causing the third computer to decrypt the encrypted display information using a public key corresponding to the secret key; and causing the third computer to display the decrypted information.

10. A method according to claim 9, further comprising causing the first computer to store the display information as sticker-like image information that indicates that a virtual shop having the display information is a virtual shop of the first corporation.

11. A method according to claim 9, further comprising causing the first computer to store the display information as speech information that indicates that a virtual shop having the display information is a virtual shop of the first corporation.

12. A method according to claim 9, further comprising:

causing the first computer to store the display information as speech information that indicates that a virtual shop having the display information is a virtual shop of the first corporation, and causing the third computer to decrypt the encrypted display information using the public key and to sound the speech information.

13. A method according to claim 9, further comprising:

causing the third computer to encrypt a purchase amount and a card number of the card issued by the first corporation using the public key and outputting the encrypted card number and the encrypted amount;

causing the second computer to receive the encrypted card number and the encrypted amount from the third computer through a network;

causing the second computer to read out an identification number of the virtual shop and a merchandise amount input by the member shop from a merchandise data storage area, encrypting the identification number and the merchandise amount using the public key, and outputting the encrypted identification number and the encrypted merchandise amount;

causing the first computer of the first corporation to decrypt the encrypted card number, the encrypted amount, the encrypted identification number, and the encrypted merchandise amount using the private key; and causing the first computer to compare the decrypted amount with the decrypted merchandise amount.

14. A method according to claim 13, further comprising causing the first computer to determine on the basis of the comparison whether a transaction can be performed, and transmitting a determination result to the second computer.

15. A method according to claim 13, further comprising causing the first computer to determine, on the basis of the comparison and a readout result of transaction confirmation data, whether a transaction can be performed, and transmitting a determination result to the second computer.

* * * * *